Oct. 27, 1953   G. L. LANG   2,656,737
GEARLESS SPEED REDUCTION MECHANISM
Filed Sept. 16, 1950   3 Sheets-Sheet 1

Inventor
GREGOR L. LANG
By Raymond A. Paquin
Attorney

Oct. 27, 1953
G. L. LANG
2,656,737
GEARLESS SPEED REDUCTION MECHANISM
Filed Sept. 16, 1950
3 Sheets-Sheet 2
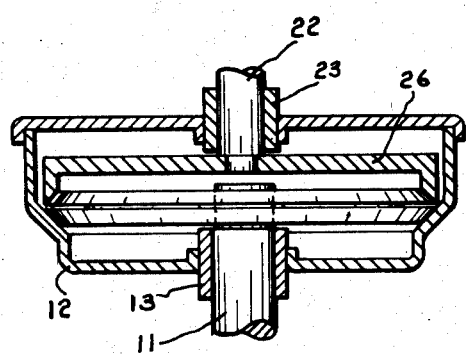
Fig. 4.
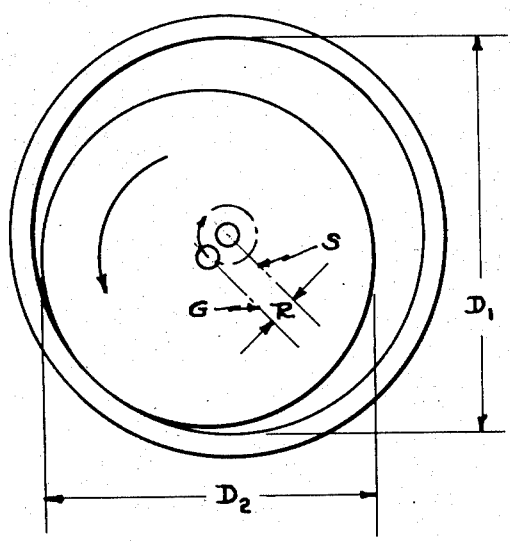
Fig. 5.
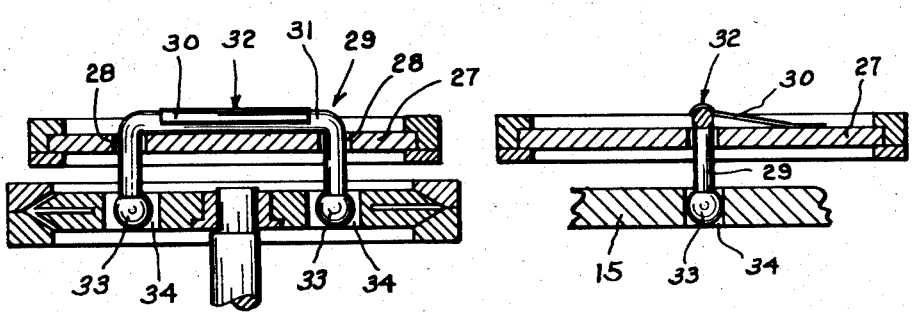
Fig. 6.
Fig. 7.
Inventor
GREGOR L. LANG
By Raymond A. Paquin
Attorney

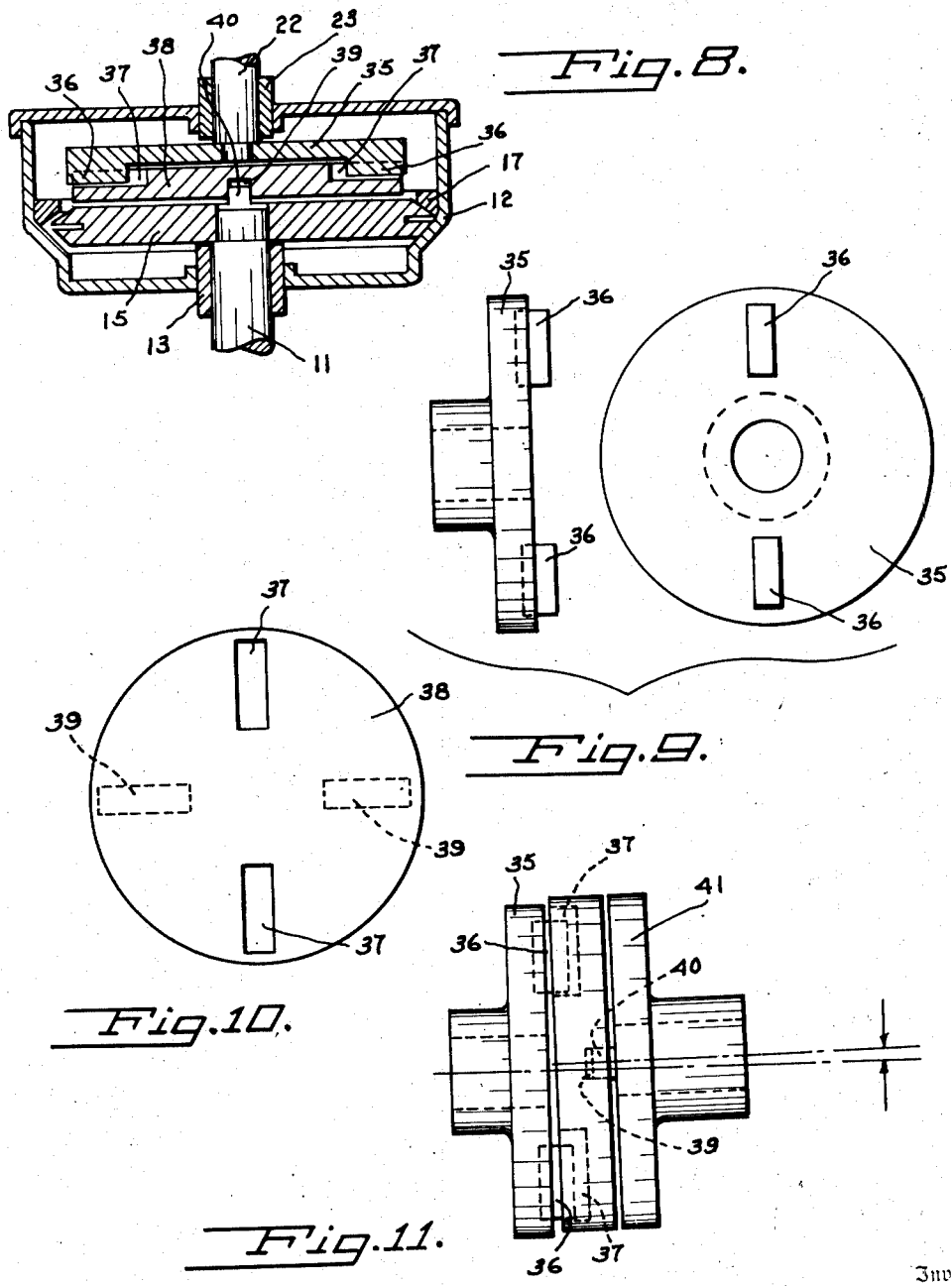

Patented Oct. 27, 1953

2,656,737

UNITED STATES PATENT OFFICE 2,656,737

GEARLESS SPEED REDUCTION MECHANISM

Gregor L. Lang, Suffield, Conn.

Application September 16, 1950, Serial No. 185,255

5 Claims. (Cl. 74—798)

This invention relates to a new and improved gearless speed reducing mechanism of the fixed ratio type.

An object of the invention is to provide such a mechanism with which reduction ratios ranging between 25 to 1 and 1000 to 1 or 100,000 to 1 or more may be obtained with only two moving parts by slight changes in some of the principal dimensions.

Another object of the invention is to provide such a mechanism which is relatively simple and economical in construction yet efficient in operation.

Another object is to provide such a mechanism which possesses ample torque handling capacity for most low power applications of high ratio reduction units and which is inherently quieter than gear reduction systems and which lends itself to mass production methods of manufacture and is inherently less expensive to produce than gear systems of comparable ratios and torque capacity.

Another object is to produce such a mechanism which is applicable, in various executions, to use in countless devices which are operated at much lower revolving speeds than the motor or shaft which drives them, for example, motor driven sign flasher switches, time delay units, phonograph turn-tables, high ratio radio tuning controls, motor driven windshield wipers, industrial program or control timers, and reduction drives for low speed shop tools such as wet grinding wheels, store window display turntables and numerous other uses.

Another object of the invention is to provide a means of maintaining a rotating member and a gyrating member in fixed angular relationship.

Other objects and advantages of the invention will be apparent from the following description taken in connection with the accompanying drawings. It will be understood that changes may be made in the details of construction and arrangement of parts as the preferred forms of the invention have been given by way of illustration only.

Referring to the drawings:

Fig. 4 is a sectional view, generally similar to Fig. 1 but showing an extreme ratio form of the invention;

Fig. 5 is a view illustrating the principle of the invention;

Fig. 6 is a sectional view, similar to Fig. 1, but showing another form of motion translation mechanism;

Fig. 7 is another view of the mechanism shown in Fig. 6 but taken at right angles to Fig. 6;

Fig. 8 is a sectional view, showing another form of motion translating mechanism; and Figs. 9, 10 and 11 are views showing the details of the motion translating mechanism embodied in the construction of Fig. 8.

Figure 1:
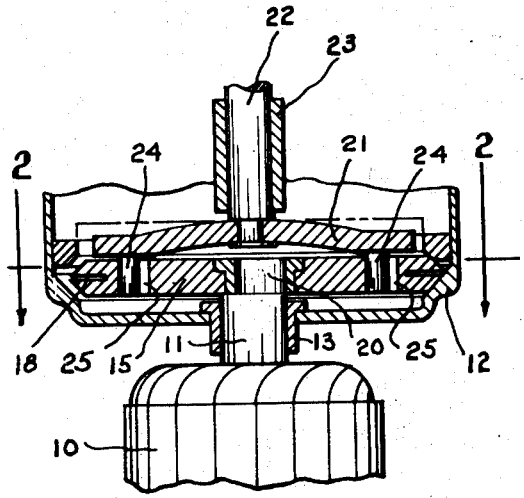
Fig. 1 is a sectional view of a speed reduction system embodying the invention.
Figure 2:
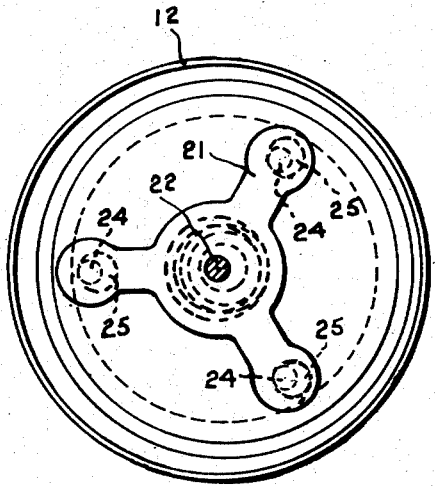
Fig. 2 is a sectional view taken on line 2—2 of Fig. 1, looking in the direction of the arrows.
Figure 3:
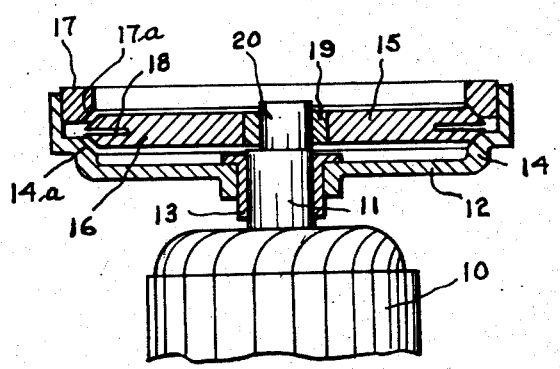
Fig. 3 is a sectional view generally similar to Fig. 1 and showing the V-track assembly.

Referring more particularly to the drawings wherein similar reference characters designate corresponding parts throughout, the form of the invention shown in Figs. 1 through 3 comprises a motor armature 10 adapted to drive shaft 11 on which is carried the cupped casing 12 having bearing sleeve 13 press fitted into a central opening in casing 12 coaxial with the friction track hereinafter described.

Casing 12 is cup shaped, as previously stated, and is provided with shoulder 14 forming a friction track 14a adapted to engage one side of the V-shaped edge 16 of disc 15 which may be of Micarta or other suitable material and has the opposite surfaces of its V-shaped edge 16 engaging a track 14a on shoulder 14 and a track on ring 17 and said V-shaped edge 16 is held in tight frictional engagement therebetween. Disc 15 may be made of properly resilient material or formed with a peripheral slot 18 in its edge as shown which provides a simple and inexpensive means of establishing a spring loading effect which functions to maintain the cooperating friction faces in tight frictional engagement. It will be understood that disc 15 could be held in tight frictional engagement by loading springs applied to the upper friction track or a split or spring-loaded gyrating disc could be employed or disc 15 might be comprised of two saucer shaped metal discs, properly contoured at their edges and assembled together with an appropriate bearing member at the center.

Disc 15 is mounted on a bearing 19 which is mounted on an eccentric or crank end 20 on shaft 11.

The motion of the gyrating disc of the type described is not true, smooth rotary motion, but it is technically spoken of as cycloidal, which is a combination of smooth rotary motion, and harmonic radial motion. A given point on the pitch line of the inner disc will describe a series of cusp-like cycloids as it progresses around the pitch line of the friction track.

For most speed reduction applications it is necessary to translate the motion of the gyrating disc, so as to permit power take-off by an auxiliary rotating shaft or disc, so arranged as to be positively driven by the rotary component only, of the cycloidal motion, while discarding or ignoring the radial component of this motion.

One method of accomplishing this smooth rotary power take-off from the gyrating disc is the use of a crow's foot translator plate 21 which is secured to shaft 22 having stationary bearing 23. Translator plate 21 has three axial drive pins 24 engaging in three oversize holes 25 in disc 15. Pins 24 must be so located on crow's foot member 21 that their centers coincide in spacing and angular relationship with the centers of the oversize holes 25 in friction disc 15. These holes 25 in disc 15 must be larger than the pins 24 by a diametral amount which is equal to or slightly more than the full throw of the eccentric crank, that is, double the throw radius of the crank.

As the friction disc 15 gyrates around in its cycloidal path, the effect of the oversized holes 25 is to wipe or slide once around the pins for each rotation of the crank. The geometrical effect of this arrangement is that at least one pin is always in a pressure or driving position relative to the hole in the disc which drives it. As the disc 15 gyrates, its rotary component of motion is transmitted to the crow's foot 21 in a smoothly transferring sequence in which the rotary drive is imparted to the pins in a smooth sequence, one after the other, with each of the pins carrying the driving load during a portion of the drive shaft rotation. Some flexibility of mounting of the pins on the crow's foot might be desirable to eliminate noise due to slight inaccuracies in machining.

The coefficient of friction might be modified or improved with corresponding variations in tractions by applying material such as high friction belt dressing to the friction disc 15 and track surfaces, or by making one of the co-operating friction faces of a resilient high friction material such as cork. This would also improve the spring loading effect.

The fundamental theory of the present invention, as will be seen from Fig. 5, depends upon the fact that a flat uncrowned pulley may be pressed radially outward against the inside face of an outer "universe" or ring pulley, and when rotated eccentrically about a radius of gyration such as to maintain contact between the inner pulley and outer ring, will rotate slowly, or at a rate which is equal to $$N\left(\frac{d_1-d_2}{d_1}\right)$$

where N is the drive shaft or eccentric crank rate of rotation, $d_1$ is the inside diameter of the outer ring or "universe ring," and $d_2$ is the outside diameter of the inner or eccentrically gyrating pulley.

It will be noted that as the crank is rotated clockwise, and pulley correspondingly gyrates clockwise, that the pulley will actually rotate about its own center in a counterclockwise direction.

In Fig. 5 R is the radius of gyration or crank throw which equals one-half of $D_1-D_2$. G is the center of the gyrating "planet" pulley and S is the center of the drive shaft.

It will be noticed that the more nearly $D_2$ approaches $D_1$, the smaller the radius of gyration will be, and the higher the differential ratio will be, the smaller the radius of the crank or eccentric drive shaft will be, and the greater the number of crank rotations which will be required to complete one revolution of the planet pulley. As $D_1$ approaches $D_2$, and the reduction ratio becomes higher, the greater is the effective friction area brought into contact between the ring and pulley, and the greater would be the torque or load capable of being driven by the system. The V-track or angular cooperating pulley faces together with spring loading serve to increase the tractive effort of the mechanism and additionally aid in eliminating the small eccentricities due to manufacturing inaccuracies.

In the form of the invention shown in Fig. 4, which is an extreme ratio friction reduction drive and is adapted to produce extreme reduction ratios of perhaps 100,000 to 1 in either forward or reverse direction, by a simple form which does not require a translator type power take-off.

In this form the upper half of the friction track 26 is rotatable and is attached to the low speed output shaft. The lower half is similar to that described in connection with Figs. 1 through 3. The method lies in so cutting or forming the friction track or the friction disc, that the effective pitch diameters of the two sides are slightly different. This will cause a slight differential travel or differential pitch line length between the two friction track halves. Considerable torque can thus be handled. As the two effective pitch diameters more nearly coincide or approach an identical dimension, the more nearly the reduction ratio approaches infinity, and the slower the low speed shaft will turn for a given rate of rotation of the high speed shaft.

The direction of rotation is determined by the choice of diameters of the two friction track halves, or depends upon which is larger than the other in pitch diameter. The ratio may be varied somewhat by making either side of the outer friction track axially adjustable and thus compressing the friction disc more or less to vary the effective pitch diameter of one side.

In the form of the invention shown in Figs. 6 and 7 another motion translating mechanism is employed. In this form there is loosely retained in plate 27 by holes 28 a substantially U-shaped stiff wire member 29 which projects through holes 28 in plate 27. Member 29 may be floatingly retained by holes 28 in plate 27 or it may be retained in position by a hinge or bearing means such as sheet spring hinge 30 which is attached to wire 29 and engages plate 27. This spring hinge 30 is such as to allow a slight freedom or rocking motion of part 31, pivoting substantially at point 32.

The lower ends of wire member 29 are provided with properly shaped ball portions 33 which slidingly engage in elongated holes 34, in the gyrating friction disc member 15. The holes 34 will be seen to be elongated only in one plane or direction as shown in Fig. 6. In the other plane, as shown in Fig. 7, the holes 34 are a close but free running fit which allows ball ends 33 a slight sliding freedom in the direction of the elongated openings 34 as shown in Fig. 6. The gyrating disc 15 is caused to gyrate and rotate about the inner faces of the stationary friction track members 14a and 17a by the eccentric action of crank 20 which rotates in bearing 19.

The rotary component of the force or motion of the friction disc 15 will be seen to be transmitted to plate 27 by imparting to wire member 29 a twisting force such that the ball ends 5 are forced in opposite directions.

The radial component of the gyrating or epicyclic motion of disc 15 is eliminated or "washed out" by the alternate and consecutive bringing into play of the two perpendicular modes of freedom enjoyed by member 29 relative to plate 27 and disc 15. During one portion of rotation, ball ends 33 slide in elongated holes 34 and during a subsequent part of rotation, which is approximately ninety degrees displaced the ball ends 33 will be relatively stationary in holes 34 and instead wire 29 will rock slightly about an axis formed by the attachment point to spring 30 at 32.

If desired spring 29 might both rock and slide in a hinge or bearing at point 32 and thus eliminate the elongation of holes 34.

In Figs. 8 to 11 inclusive is shown another form of motion translating mechanism which can be employed with the speed reduction mechanism of the present invention. This arrangement is an adaptation of the Oldham coupling principle and as shown in Figs. 9, 10 and 11, wherein the member 35 is provided with the two ribs or rectangular blocks 36 and slots 37 are formed in the coupling disc 38 which may be of fibre, leather or rubber fabric. These slots 37 are dimensioned in width to just allow free sliding of the blocks 36 therein will, in length, the slots 37 are greater than the length of the blocks by amount dependent upon the amount of shaft displacement which it is desired to accommodate.

The disc 38 is provided with a pair of slots 39 on the side thereof opposite slots 37 and spaced substantially ninety degrees from slots 37. These slots 39 are adapted to accommodate rectangular blocks 40 on member 41 and the relative size and shape of slots 39 and blocks 40 is similar to slots 37 and blocks 36.

The principal feature of the Oldham coupling execution is that it allows the two shafts to be coupled together in a true and exact rotational angular relationship even though the two shaft axes are laterally displaced or not in true coaxial relationship as shown in Fig. 11 with the axis of one member gyrating about the axis of the other member.

In the arrangement of Fig. 8, the slotted Oldham disc 38 is a floating member, being engaged from below by two lugs 40 carried by the friction disc 15 and from above by two lugs 36 carried by the low speed shaft translator or drive plate. The arrangement obviously could be reversed with the lugs being attached to the floating Oldham disc 38.

Instead of the slots 37 and 39 and blocks 36 and 40, drive pins and oversized openings may be employed. This arrangement allows for angular error or non-parallelism of the two shafts similar to a universal joint of limited motion.

From the above it will be seen that I have provided simple, efficient and economical means for obtaining all of the objects and advantages of the invention.

Having described my invention, I claim:

1. A speed reduction mechanism comprising a track means having a V-shaped face, one part of said track means being stationary and the other part opposed to the stationary part operatively connected to an output shaft, a friction disc means mounted for rotation between the opposed track parts, said friction disc means having a V-shaped face adapted to engage the V-shaped face of said track means, opposed portions of said engaging faces being of different effective pitch diameters.

2. A speed reduction mechanism comprising a track means having a V-shaped face, one part of said track means being stationary and the other part opposed to the stationary part operatively connected to an output shaft, a friction disc means mounted for rotation between the opposed track parts, said friction disc means having a V-shaped face adapted to engage the V-shaped face of said track means, and the opposite track means engaging faces of said disc means being of different pitch diameters.

3. A speed reduction mechanism comprising a track means having a V-shaped face, one part of said track means being stationary and the other part opposed to the stationary part operatively connected to an output shaft, a friction disc means mounted for rotation between the opposed track parts, said friction disc means having a V-shaped face adapted to engage the V-shaped face of said track means, the disc engaging face of the rotary track part and the disc engaging face of the stationary track part being of different effective pitch diameters.

4. A speed reduction mechanism comprising a track means having a V-shaped face, one part of said track means being stationary and the other part opposed to the stationary part operatively connected to an output shaft, a friction disc means mounted for rotation between the opposed track parts, said friction disc means having a V-shaped face adapted to engage the V-shaped face of said track means, the disc engaging face of the rotary track part, the disc engaging face of the stationary track part and the V-shaped face of said disc means being of different effective pitch diameters.

5. A speed reduction mechanism comprising a stationary casing and a track means having a V-shaped face within said casing, one part of said track means being carried by said stationary casing and the other part of said track means operatively connected to an output shaft, a resilient friction disc means carried by an input shaft mounted for rotation between the opposed track parts, said friction disc means having a V-shaped face adapted to engage the V-shaped face of said track means, the disc engaging face of the stationary track part, the disc engaging face of the rotary track part and the track engaging face of said resilient friction disc means being of different pitch diameters effective upon rotation of said friction disc member in said track arrangement.

GREGOR L. LANG.

References Cited in the file of this patent

UNITED STATES PATENTS

| Number | Name | Date |
| --- | --- | --- |
| 281,528 | Larzelere | July 17, 1883 |
| 885,354 | Loquin | Apr. 21, 1908 |
| 1,590,166 | Howard | June 22, 1926 |
| 1,709,345 | Garrard | Apr. 16, 1929 |
| 1,811,921 | Edmunds | June 30, 1931 |
| 1,862,220 | Johnson | June 7, 1932 |
| 2,250,259 | Foot, Jr. | July 22, 1941 |
| 2,293,407 | Schirrmeister | Aug. 18, 1942 |

FOREIGN PATENTS

| Number | Country | Date |
| --- | --- | --- |
| 2,237 | Sweden | July 6, 1904 |